HARRIS & BROWNING.
NUT FASTENER.
No. 61,620.  Patented Jan. 29, 1867.
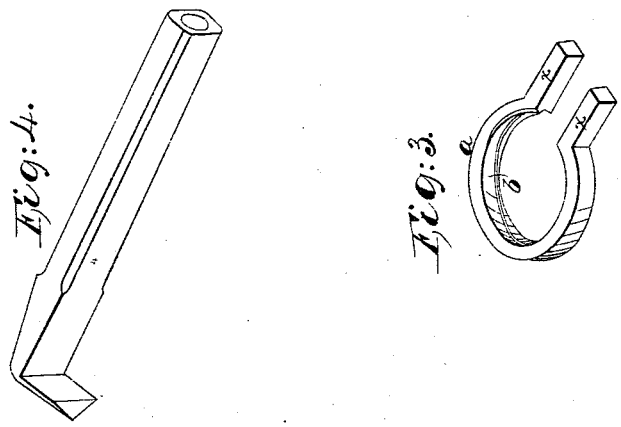
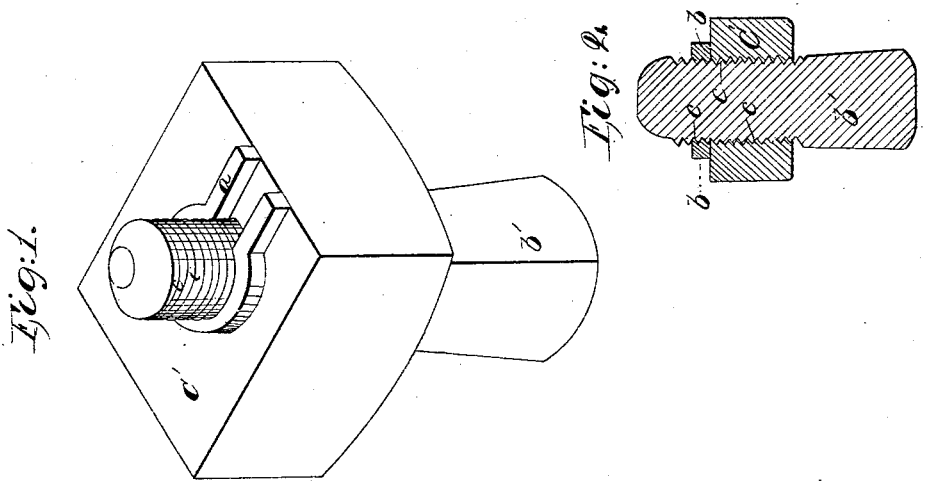
Inventor:
Wm Harris
Clinton Browning

United States Patent Office.

WILLIAM HARRIS AND CLINTON BROWNING, OF RUSH RUN, OHIO.

Letters Patent No. 61,620, dated January 29, 1867.

IMPROVEMENT IN NUT FASTENER.

*The Schedule referred to in these Letters Patent and making part of the same.*

TO ALL WHOM IT MAY CONCERN:

Be it known that we, WILLIAM HARRIS and CLINTON BROWNING, of Rush Run, Jefferson county, State of Ohio, have invented a new and useful improvement for preventing the rattling of Nuts, and for preventing them from becoming loose; and we do hereby declare the following to be a full, clear, and exact description thereof, sufficient to enable any person skilled in the art to make and practise our invention, reference being had to the accompanying drawings, forming a part of this, our specification, in which—

Figure 1 is a perspective view of our improvement applied to an ordinary nut which has been screwed upon a bolt.

Figure 2, a cross-section of fig. 1; and

Figure 3, a view of our improvement detached from a nut.

The object of our invention is to provide the means whereby, with certainty and ease, and with only a moment's work, a retaining device may be added to a nut of ordinary construction, which shall efficiently hold it in place where it has been applied for use, and also prevent it from becoming loose and rattling; and which invention is also equally applicable to hold in place a pin, such as is used in hinges or joints.

For these purposes we construct a spring friction yoke, $a$, of metal, having a spring temper, in the form represented in the figures; which yoke $a$ is provided with a female screw, $b$, that may precisely register with the male screw $c$ of the bolt to which it is intended to be applied. But for this purpose it is not intended that the diameter of the yoke $a$ should be the same as that of the bolt, but the size of the screw-thread only; and that of the female screw should be the same, or nearly the same. The yoke itself, however, should be constructed of a diameter (in that part of it which is intended to clasp the bolt) less than the bolt, so that when applied to the bolt, as shown in figs. 1 and 2, the bolt $b'$ will be firmly clasped with a constant spring friction sufficient to retain the hold of the yoke upon the bolt and the nut $c'$ to its seat. For convenience in applying the yoke to the bolt, we construct it with projections $x\,x$, so that when a pocket wrench, such, for instance, as seen in Figure 4, is applied between said projections, they may readily be spread apart, and thus the yoke be easily turned upon the bolt, whether it be for the purpose of "screwing up" or "unscrewing."

Having thus described our invention, what we claim as new, and desire to secure by Letters Patent of the United States, is—

We claim, as an article of manufacture, a spring-metal friction yoke, constructed substantially in the manner and for the purpose herein set forth.

WILLIAM HARRIS,
CLINTON BROWNING.

Witnesses:
WM. MARSHALL,
JAS. W. DAWSON.